(12) United States Patent
Seo (10) Patent No.: US 8,228,344 B2
(45) Date of Patent: *Jul. 24, 2012

(54) METHOD FOR SETTING BASIC DISPLAY SCREEN IN MOBILE TERMINAL

(75) Inventor: Jin-Gyu Seo, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/167,261

(22) Filed: Jun. 23, 2011

(65) Prior Publication Data

US 2011/0254858 A1    Oct. 20, 2011

Related U.S. Application Data

(63) Continuation of application No. 11/491,686, filed on Jul. 24, 2006, now Pat. No. 7,800,633, and a continuation of application No. 12/854,571, filed on Aug. 11, 2010.

(30) Foreign Application Priority Data

Jul. 22, 2005    (KR) .................. 10-2005-0067032

(51) Int. Cl.
*G09G 5/00* (2006.01)
*H04M 1/00* (2006.01)
*H04B 1/38* (2006.01)
*G06F 3/048* (2006.01)

(52) U.S. Cl. .................. 345/629; 455/566; 715/835
(58) Field of Classification Search .................. 345/629; 455/566; 715/835
See application file for complete search history.

(56) References Cited

U.S. PATENT DOCUMENTS

| 6,278,448 B1 | 8/2001 | Brown et al. |
| 6,408,191 B1 | 6/2002 | Blanchard et al. |
| 2001/0029193 A1 | 10/2001 | Ishigaki |
| 2002/0132610 A1 | 9/2002 | Chaplin et al. |
| 2002/0154142 A1 | 10/2002 | Thomason |
| 2003/0045315 A1 | 3/2003 | Vasa |
| 2004/0259598 A1 | 12/2004 | Wagner et al. |
| 2005/0050474 A1 | 3/2005 | Bells et al. |
| 2005/0156879 A1 | 7/2005 | Honda et al. |

FOREIGN PATENT DOCUMENTS

| CN | 1311596 | 9/2001 |
| JP | 2001-245352 | 9/2001 |
| JP | 2002-051121 | 2/2002 |
| JP | 2002-208993 | 7/2002 |

(Continued)

OTHER PUBLICATIONS

A5302CA Manual, Dec. 31, 2002.

*Primary Examiner* — Ryan R Yang
(74) *Attorney, Agent, or Firm* — The Farrell Law Firm, P.C.

(57) ABSTRACT

A method and apparatus for setting a display screen is provided. The method includes displaying an indicator; receiving a first input selecting the indicator; displaying at least one indicator image in relation to the indicator; receiving a second input selecting one of the at least one indicator image; setting the selected image as a display image of the indicator; setting a location of the indicator on the display screen; and displaying the display screen according to the set location of the indicator.

22 Claims, 5 Drawing Sheets

FOREIGN PATENT DOCUMENTS

| | | |
|---|---|---|
| JP | 2003-005946 | 1/2003 |
| JP | 2003-008694 | 1/2003 |
| JP | 2005-130005 | 5/2005 |
| RU | 2002125870 | 2/2004 |
| WO | WO 01/63392 | 8/2001 |
| WO | WO 02/19667 | 3/2002 |

METHOD FOR SETTING BASIC DISPLAY SCREEN IN MOBILE TERMINAL

PRIORITY

This application is a continuation application of application Ser. No. 12/854,571 filed on Aug. 11, 2010, which is a continuation of application Ser. No. 11/491,686, which was filed in the United States Patent and Trademark Office on Jul. 24, 2006, which claims priority to an application entitled "Method for Setting Basic Display Screen In Mobile Terminal" filed with the Korean Intellectual Property Office on Jul. 22, 2005 and assigned Serial No. 2005-0067032, the contents of which are incorporated herein by reference.

BACKGROUND OF THE INVENTION

1. Field of the Invention

The present invention relates to a mobile terminal, and more particularly to a method for setting a basic display screen in a mobile terminal.

2. Description of the Related Art

A "basic display screen" of a mobile terminal refers to a picture displayed in a standby mode of the mobile terminal. Generally, a basic display screen includes multiple status indicators and a background image. The status indicators show any function set in the mobile terminal, status information and any event that has occurred in the mobile terminal. The status indicators include indicators of signal strength, incoming call alert mode, alarm setting, arrival of a text message, function currently set in the mobile terminal, current date and time, battery level and so on. Events occurring in relation to the operation of the mobile terminal, such as an alarm, an incoming call and arrival of a text message, can be indicated on the display screen using relevant status indicators.

Figure 4:
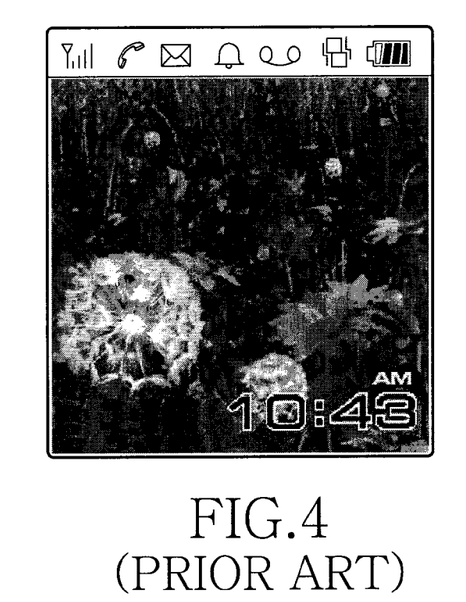
FIG. 4 is a view illustrating a typical basic display screen in the prior art.

FIG. 4 illustrates an example of a typical basic display screen of a mobile terminal. Referring to FIG. 4, various status indicators are shown at the very top of the display screen. A current signal strength is indicated using an indicator of an antenna image. An incoming call alert mode (for example, a silent vibration mode) is indicated using an indicator of a vibrating phone image. An alarm setting is indicated using an indicator of a bell image. Also, arrival of a text message is indicated using an indicator of an envelope image.

Typically, such status indicators are displayed at the top of the screen in a size too small to be easily readable. In other words, the typical indicators have low information readability. In particular, users may have difficulty in reading the small indicators. Also, users may become bored with the indicators which are simple fixed images.

An image stored in a mobile terminal, an image taken using a built-in camera of a mobile terminal, a downloaded image or a simple flash image is generally set as background for a basic display screen in the standby mode. Users cannot set more creative images satisfying their demand for distinctiveness and expression of individuality. Accordingly, they become easily bored with a background image set for a basic display screen.

SUMMARY OF THE INVENTION

Accordingly, the present invention has been made to solve the above-mentioned problems occurring in the prior art and to provide at least the advantages below. An object of the present invention is to provide a method for setting a basic display screen in a mobile terminal, which can improve readability of status indicators displayed on the basic display screen.

Another object of the present invention is to provide a method for setting a basic display screen with various background images in a mobile terminal.

Still another object of the present invention is to provide a method for setting a basic display screen in a mobile terminal, which enables the display of status indicators using various images other than those fixed for the respective indicators according to status information.

According to one aspect of the present invention, a method for setting a display screen is provided. The method includes displaying an indicator; receiving a first input selecting the indicator; displaying at least one indicator image in relation to the indicator; receiving a second input selecting one of the at least one indicator image; setting the selected image as a display image of the indicator; setting a location of the indicator on the display screen; and displaying the display screen according to the set location of the indicator.

According to another aspect of the present invention, an apparatus for setting a display screen is provided. The apparatus includes a display unit for displaying the display screen; and a control unit for displaying an indicator on the display unit, receiving a first input selecting the indicator, displaying at least one indicator image in relation to the indicator, receiving a second input selecting one of the at least one indicator image, setting the selected image as a display image of the indicator, setting a location of the indicator on the display screen, and displaying the display screen according to the set location of the indicator.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
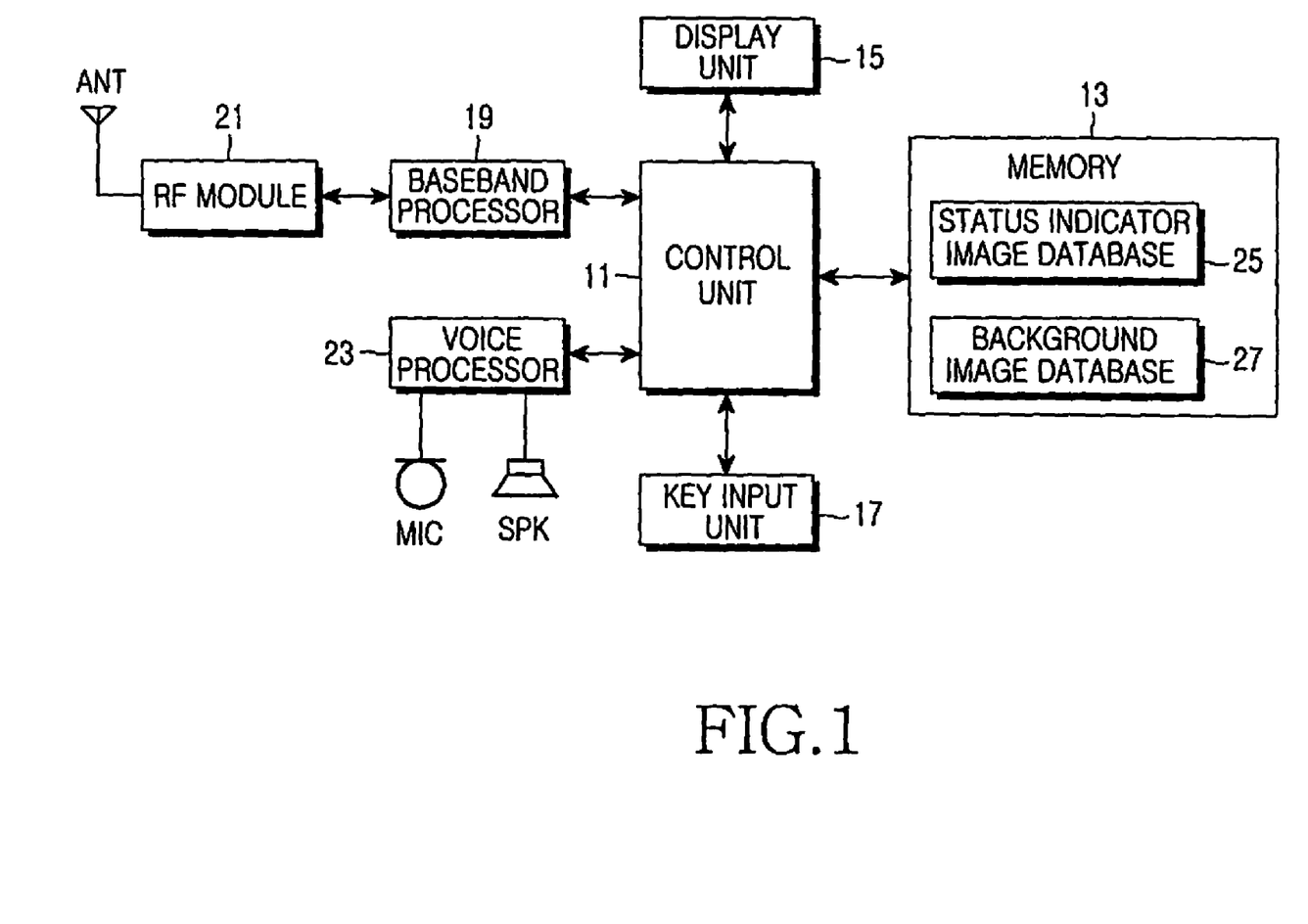
FIG. 1 is a block diagram of a mobile terminal according to a preferred embodiment of the present invention.

FIG. 1 is a block diagram of a mobile terminal according to a preferred embodiment of the present invention. Referring to FIG. 1, the mobile terminal includes a control unit 11, a memory 13, a display unit 15, a key input unit 17, a baseband processor 17, an RF (radio frequency) module 21 and a voice processor 23.

The control unit 11 controls overall operations of the mobile terminal.

The display unit 15 displays various information and an image received from a base station or stored in the memory 13 under the control of the control unit 11.

The key input unit 17 is provided with keys numbered 0 to 9, a # key, a * key, a direction key and a plurality of function keys (such as menu, select, send, cancel, on/off and volume keys) for performing various functions available in the mobile terminal. The key input unit 17 transmits data corresponding to a key pressed by a user to the control unit 11. Each of the keys numbered 0 to 9 is assigned a plurality of alphabetic characters.

The RF module 21 transmits and receives RF signals to and from the base station through an antenna. The RF module 21 modulates a signal inputted from the control unit 11 through the baseband processor 19 and transmits the modulated RF signal through the antenna. Also, the RF unit 21 demodulates an RF signal received through the antenna and transfers the signal to the control unit 11 through the baseband processor 19. The baseband processor 19 processes baseband signals transmitted or received between the RF module 21 and the control unit 11.

The voice processor 23 connected to the control unit 11, the microphone connected to the voice processor 23, and the speaker are all used during a phone call or voice recording.

The memory 13 stores programs for any processing or control by the control unit 11, reference data, updateable data and various types of multimedia data to serve as a working memory for the control unit 11. According to a preferred embodiment of the present invention, the memory 13 includes a status indicator image database 25 and a background image database 27.

The status indicator image database 25 can store various images that can be used as status indicators. The status indicators can indicate the current status of the mobile terminal and any function currently set in the mobile terminal. The status indicators can show any event occurring in relation to the operation of the mobile terminal or the current status of the mobile terminal, and any event processing results as well. Status information showing the current status of the mobile terminal can include, for example, signal strength, incoming call alert mode, alarm setting, arrival of a text message, function currently set in the mobile terminal, current date and time, battery level, etc. Events occurring in relation to the operation of the mobile terminal or reflecting the current status of the mobile terminal can include, for example, generation of an alarm, receiving of an incoming call, arrival of a text message, battery discharge, a change in signal strength, etc. According to the present invention, various indicator images relating to the status or events of the mobile terminal can be stored in the status indicator image database 25. The indicator images stored in the status indicator image database 25 may be easily readable to show the corresponding status or events. For example, a flower image as well as a conventional antenna image can be stored as signal-strength indicator images. A water bottle or fishbowl image can be stored as a battery level indicator. A wall-clock image can be stored as a time indicator. Also, a detachable note paper image or a neon sign image can be stored as an indicator showing a text message arrival or a missed call.

In order to exactly show the current status or event occurring in the mobile terminal, various versions (i.e. slightly modified images) of each indicator image can be stored. For example, three versions of a water bottle image (a filled water bottle image, a half-filled water bottle image and an empty water bottle image) can be stored to show the battery level.

The background image database 27 stores various background element images that can be included in a background of the basic display screen. The background elements can include wallpapers, furniture, dolls, characters, picture frames and other elements for decorating the background. In other words, the background image database 27 can store various wallpaper images, furniture images, doll images, character images, frame images, etc.

Figure 2:
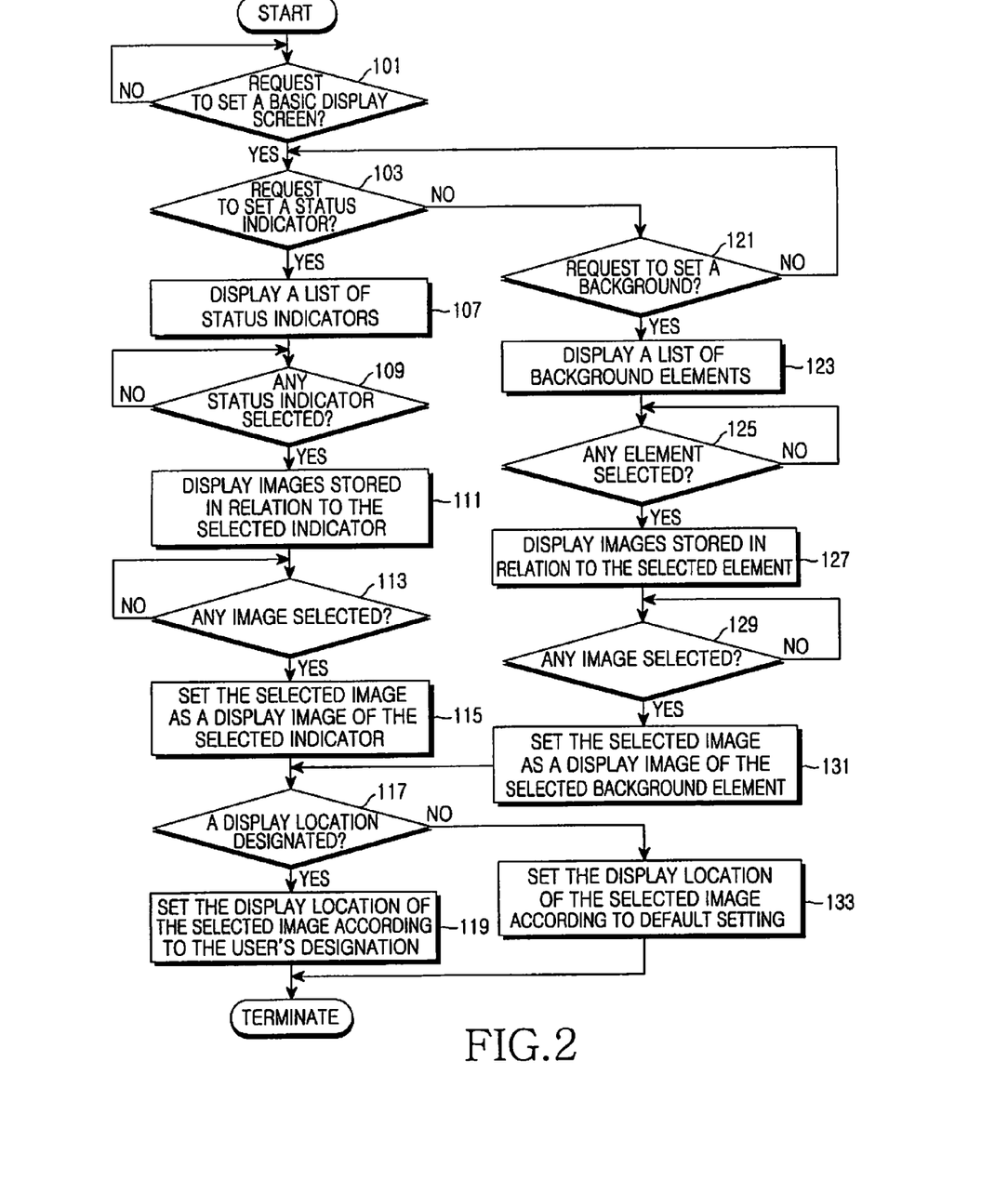
FIG. 2 is a flow chart showing a process of setting a basic display screen in a mobile terminal according to a preferred embodiment of the present invention.

Hereinafter, a process of setting a basic display screen in a mobile terminal will be explained with reference to FIG. 2. Referring to the flow chart of FIG. 2, the control unit 11 detects a request inputted by the user to set a basic display screen in step 101 and proceeds to step 103 in order to determine whether the inputted request is to set status indicators. If the inputted request is to set status indicators, the control unit 11 will proceed to step 107. Otherwise, the control unit 11 will proceed to step 121. In step 107, the control unit 11 displays a list of status indicators. The status indicators showing the current status of the mobile terminal include a signal strength indicator, an incoming call alert mode indicator, an alarm indicator, a text message arrival indicator, a missed call indicator, a current function indicator, a current date/time indicator, and a battery level indicator. When the user selects one of the listed status indicators in step 109, the control unit 11 proceeds to step 111 and displays a plurality of indicator images which were previously stored in the status indicator image database 25 in relation to the selected status indicator. For example, if the user selects the text message arrival indicator from the displayed list, the control unit 11 can display an envelope image, a neon sign image and a detachable note paper image which were previously stored in relation to the text message arrival indicator. When the user selects one of the displayed indicator images in step 113, the control unit 11 proceeds to step 115 in order to set the selected image as a display image of the selected status indicator. For example, if the user selects the detachable note paper image from the indicator images displayed in relation to the text message arrival indicator, the control unit 11 can set the detachable note paper image as a display image of the text message arrival indicator.

Subsequently, the control unit 11 detects whether the user inputs a key to designate the display location of the selected indicator image in step 117. If such a key is inputted, the control unit 11 can proceed to step 119 in order to set the display location of the selected indicator image according to the user's input and then terminate the status indicator setting process. If the user does not input a key to designate the display location of the selected indicator, the control unit 11 can proceed to step 133 in order to set the display location of the selected indicator image according to the default setting.

The process explained above is carried out to set a display image of a specific status indicator on the basic display screen. Hereinafter, a process of setting a background of the basic display screen will be explained with reference to steps 121 to 133 of FIG. 2. When the user inputs a request to set a background of the basic display screen in step 121, the control unit 11 proceeds to step 123 in order to display a list of available background elements. The background elements can include wallpapers, furniture, dolls, characters, picture frames and other elements for decorating the background. When the user selects one of the listed background elements in step 125, the control unit 11 proceeds to step 127 in order to display a plurality of images previously stored in the background image database 27 in relation to the selected background element. For example, if the user selects "picture frames" from the listed background elements, the control unit 11 can display various picture frame images previously stored in the background image database 27. When the user selects one of the displayed images in step 129, the control unit 11 proceeds to step 131 and can set the selected image as a display image of the selected background element. The control unit 11 can set the display location of the selected background element image through steps 117 to 133 and can then terminate the background element setting process.

Figure 3:
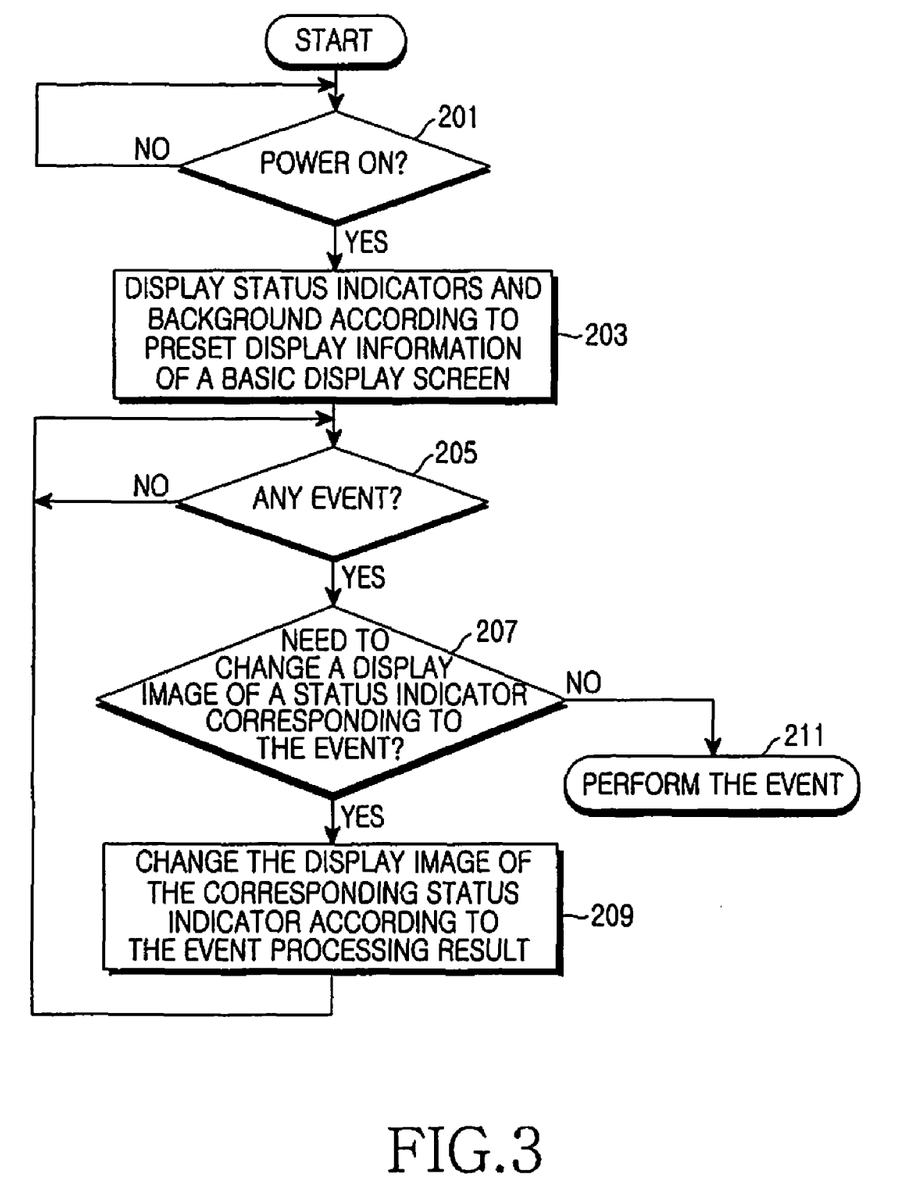
FIG. 3 is a flow chart showing a process of displaying a basic display screen according to a preferred embodiment of the present invention.

A process of displaying a basic display screen will be described with reference to FIG. 3. Referring to the flow chart of FIG. 3, when the mobile terminal is powered on in step 201, the control unit 11 proceeds to step 203 in order to display a basic display screen which includes status indicators and a background according to the basic display screen display information previously set through the process of FIG. 2. When the control unit 11 detects any event occurring in the mobile terminal in step 205, it can proceed to step 207 in order to determine whether it is necessary to change the display of the status indicators due to the event. If the control unit 11 determines that the display of the status indicators need to be changed, it can proceed to step 209. Otherwise, the control unit 11 can perform an operation corresponding to the event in step 211. In step 209, the control unit 11 can perform the event and output a preset display image of a status indicator corresponding to the event. Then the control unit 11 can proceed again to step 205.

For example, if the event detected in step 205 is arrival of a text message, the control unit 11 can determine that the display of the status indicators should be changed to include a preset display image of a text message arrival indicator. If a detachable note paper image was previously set as the display image of the text message arrival indicator, the control unit 11 can display the detachable note paper image indicating the arrival of a new text message at a previously set location on the basic display screen in step 209. If the event detected in step 205 is a change of signal strength from normal to a lower level, the control unit 11 can determine that the current display image of the signal strength indicator should be changed to reflect the lowered signal strength. If a flower image was previously set as the display image of the signal strength indicator, the control unit 11 can change the display image of the signal strength indicator from, for example, a fresh flower to a withered flower in step 209.

Figure 5A:
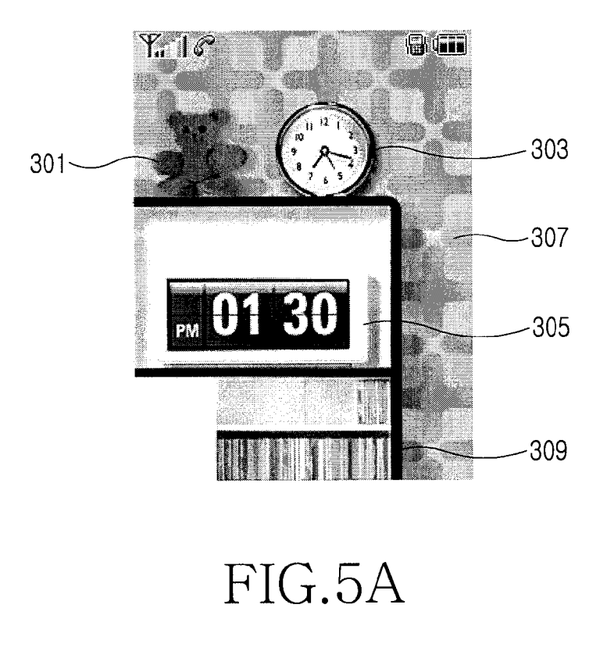
FIGS. 5a to 5c are views illustrating first to third basic display screens according to a preferred embodiment of the present invention.
Figure 5B:
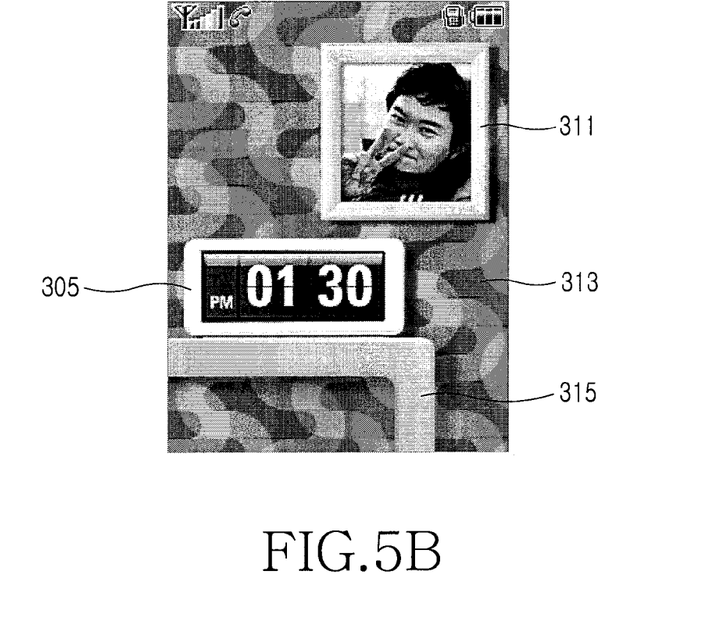
Figure 5C:
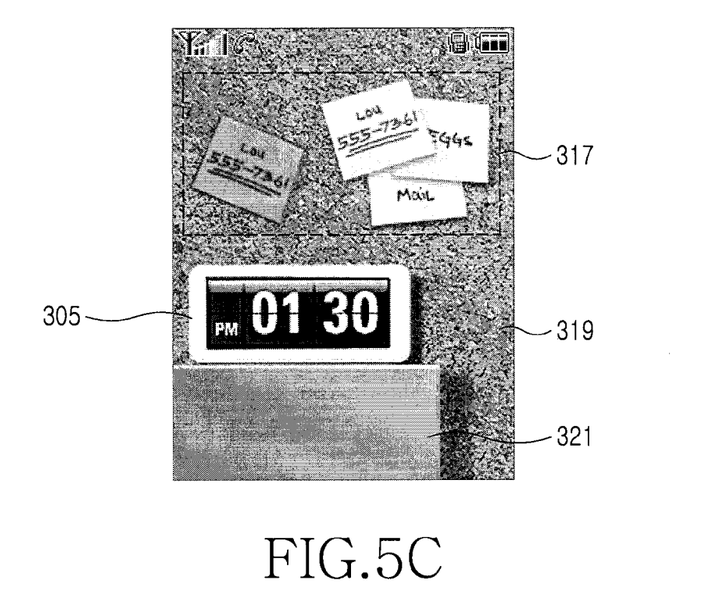

A basic display screen which can be set through the above process is illustrated in FIGS. 5a to 5c. FIG. 5a illustrates a first basic display screen according to a preferred embodiment of the present invention. Referring to FIG. 5a, the first basic display screen includes an analogue clock image 303 indicating time of another region and a digital clock image 305 which were set as display images of the current date/time indicator. The first basic display screen also includes images of a wallpaper 307 and a doll 301 and a bookcase 309 as background elements. FIG. 5b illustrates a second basic display screen according to a preferred embodiment of the present invention. Referring to FIG. 5b, the second basic display screen includes the digital clock image 311 which was set as a display image of the current time indicator, and background element images, such as a wallpaper 313 (which is different from the wallpaper 307 of the first basic display screen), a table 315 and a picture frame 317. According to another embodiment of the present invention, the user can select any background element in the second basic display screen to change the element. For example, the user can select the picture frame 317 in the second display screen of FIG. 5b and change the picture in the frame 317 to another one. FIG. 5c illustrates a third basic display screen according to a preferred embodiment of the present invention. Referring to FIG. 5c, the third basic display screen includes the digital clock image 319 which was set as a display image of the current time indicator and a detachable note paper image 321 which was set as a display image of the text message arrival or missed call indicator. The third basic display image also includes a wallpaper image 323 (which is different from the wallpaper 313 in the second basic display screen) and a table image 325 as background elements.

As explained above, the mobile terminal according to the present invention stores a plurality of indicator images corresponding to each of a plurality of status indicators, and a plurality of images which can be used as background elements. The user can set a basic display screen by selecting desired display images of respective status indicators and various background element images. The indicator images changing with the change of status or according to the user's selection are easily readable and give pleasure to the user.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for setting a display screen, the method comprising:
   displaying an indicator;
   receiving a first input selecting the indicator;
   displaying at least one indicator image in relation to the indicator;
   receiving a second input selecting one of the at least one indicator image;
   setting the selected image as a display image of the indicator;
   setting a location of the indicator on the display screen; and
   displaying the display screen according to the set location of the indicator.

2. The method of claim 1, further comprising selecting a background element of the display screen.

3. The method of claim 1, wherein the indicator is a status indicator.

4. The method of claim 3, wherein the status indicator includes at least one of a signal strength indicator, an incoming call alert mode indicator, an alarm indicator, a text message arrival indicator, a missed call indicator, a current function indicator, a current date/time indicator, and a battery level indicator.

5. The method of claim 4, wherein the text message arrival indicator includes a detachable note paper image.

6. The method of claim 5, further comprising:
   detecting an arrival of a new text message; and
   displaying the detachable note paper image in order to indicate the arrival of the new text message.

7. The method of claim 3, wherein the background element includes at least one of wallpaper, furniture, a decorative article, a character, and a picture frame.

8. The method of claim 7, further comprising displaying a picture selected by a user in the picture frame on the display screen, when the picture frame image is selected, by the user, from among the background elements.

9. The method of claim 3, wherein selecting the background element of the display screen comprises:
   displaying a background element for composing a background of the display screen;
   receiving a third input selecting the background element;
   displaying a plurality of images stored in relation to the selected background element;

receiving a fourth input selecting one of the displayed plurality of images; and setting the selected image as a display image of the selected background element.

10. The method of claim 1, wherein setting the location of the selected image on the display screen comprises:

displaying the selected image according to a default setting, if the user does not designate a specific display location for the indicator.

11. The method of claim 1, further comprising:

determining whether the display image of the indicator is an image to be changed according to an occurrence of an event corresponding to the indicator; and changing the display image of the indicator according to an event processing result when the display image of the indicator should be changed.

12. A apparatus for setting a display screen, comprising:

a display unit for displaying the display screen; and a control unit for displaying an indicator on the display unit, receiving a first input selecting the indicator, displaying at least one indicator image in relation to the indicator, receiving a second input selecting one of the at least one indicator image, setting the selected image as a display image of the indicator, setting a location of the indicator on the display screen, and displaying the display screen according to the set location of the indicator.

13. The apparatus of claim 12, wherein the control unit selects a background element of the display screen.

14. The apparatus of claim 12, wherein the indicator is a status indicator.

15. The apparatus of claim 14, wherein the status indicator includes at least one of a signal strength indicator, an incoming call alert mode indicator, an alarm indicator, a text message arrival indicator, a missed call indicator, a current function indicator, a current date/time indicator, and a battery level indicator.

16. The apparatus of claim 15, wherein the text message arrival indicator includes a detachable note paper image.

17. The apparatus of claim 16, wherein the control unit detects an arrival of a new text message, and displays the detachable note paper image in order to indicate the arrival of the new text message.

18. The apparatus of claim 14, wherein the background element includes at least one of wallpaper, furniture, a decorative article, a character, and a picture frame.

19. The apparatus of claim 18, wherein the control unit displays a picture selected by a user in the picture frame on the display screen, when the picture frame image is selected, by the user, from among the background elements.

20. The apparatus of claim 14, wherein the control unit displays a background element for composing a background of the display screen, receives a third input selecting the background element, displays a plurality of images stored in relation to the selected background element, receives a fourth input selecting one of the displayed plurality of images, and sets the selected image as a display image of the selected background element.

21. The apparatus of claim 12, wherein the control unit displays the selected image according to a default setting, if a user does not designate a specific display location for the indicator.

22. The apparatus of claim 12, the control unit determines whether the display image of the indicator should be changed by occurrence of an event corresponding to the indicator; and changes the display image of the indicator according to an event processing result when the display image of the indicator should be changed.

* * * * *